United States Patent [19]

Kannabiran

[11] Patent Number: 5,201,020
[45] Date of Patent: Apr. 6, 1993

[54] REINFORCED PROTECTIVE TUBE FOR OPTICAL WAVEGUIDE FIBERS

[75] Inventor: Rengan Kannabiran, Big Flats, N.Y.

[73] Assignee: Corning Incorporated, Corning, N.Y.

[21] Appl. No.: 610,506

[22] Filed: Nov. 8, 1990

[51] Int. Cl.⁵ .............................................. G02B 6/44
[52] U.S. Cl. ...................................... 385/113; 385/109
[58] Field of Search ................. 350/96.23, 96.2, 96.21, 350/96.22; 385/109, 110, 113

[56] References Cited

U.S. PATENT DOCUMENTS

| | | | |
|---|---|---|---|
| 4,304,462 | 12/1981 | Baba et al. | 350/96.23 |
| 4,330,173 | 5/1982 | Oestreich | 350/96.23 |
| 4,629,286 | 12/1986 | Fuse et al. | 350/96.23 |
| 4,664,472 | 5/1987 | Mayr et al. | 350/96.23 |
| 4,704,151 | 11/1987 | Keck | 65/4.1 |
| 4,723,831 | 2/1988 | Johnson et al. | 350/96.23 |
| 4,730,894 | 3/1988 | Arroyo | 350/96.23 |
| 4,756,600 | 7/1988 | Ramsay et al. | 350/96.3 |
| 4,765,702 | 8/1988 | Dohan et al. | 350/96.12 |
| 4,776,910 | 10/1988 | Taylor et al. | 156/145 |
| 4,805,981 | 2/1989 | Gould | 350/96.23 |
| 4,902,096 | 2/1990 | Calzolari et al. | 350/96.23 |
| 4,902,324 | 2/1990 | Miller et al. | 65/3.11 |
| 4,932,746 | 6/1990 | Calzolari et al. | 350/96.23 |
| 4,933,262 | 6/1990 | Beguin | 430/320 |
| 4,943,130 | 7/1990 | Dannoux et al. | 350/96.12 |
| 5,050,957 | 9/1991 | Hamilton et al. | 385/113 |

FOREIGN PATENT DOCUMENTS

| | | |
|---|---|---|
| 91117260 | 5/1992 | European Pat. Off. |
| 2532440 | 3/1984 | France |
| 2185828 | 7/1987 | United Kingdom |

OTHER PUBLICATIONS

Toute L'Electronique, No. 478, Nov. 1992, Paris, France, p. 7, "Realisation CLTO pour L'Aeronautique".

"Flexible Protective Tubes for Optical Fibers"; Notice No. SCFO-06, 1987; Silec Product Catalog.

Siecor Fiber Optic Catalog 1988-1989, pp. 1.2, 1.3, and 1.20, 1988.

*Primary Examiner*—John D. Lee
*Assistant Examiner*—S. Barns
*Attorney, Agent, or Firm*—K. McNeill Taylor, Jr.

[57] ABSTRACT

Reinforced protective tubes for optical waveguide fibers are provided. The tubes include an inner layer of a polyester elastomer, an outer layer of a polyvinyl chloride polymer, and two longitudinal reinforcing members composed of aramid fibers. The tubes have low thermal expansion, an outside diameter of less than about 1,000 microns, and can be used to form the pigtails of optical waveguide couplers. Methods for producing the protective tubes in which the reinforcing members and the plastic layers are coated onto a removable core member are also disclosed.

25 Claims, 4 Drawing Sheets

REINFORCED PROTECTIVE TUBE FOR OPTICAL WAVEGUIDE FIBERS

BACKGROUND OF THE INVENTION

1. Field of the Invention

This invention relates to optical waveguide fibers and, in particular, to an improved protective tube for such fibers.

2. Description of the Prior Art

As is well known in the art, optical waveguide fibers are mechanically fragile and exhibit degraded light transmission when bent ("bend losses"). Accordingly, in most applications, fibers are housed in protective coverings. These coverings are generally referred to as "tubes" when individual fibers are being protected or as "cables" when multiple fibers have been grouped together and protected as a unit. Also, two general packaging arrangements for optical waveguide fibers have been recognized in the art—those which include a tight buffer layer which is in direct contact with the fibers, and those in which the fiber is loose within the covering. The present invention is concerned with protective coverings of the tube type, i.e., protection for a single fiber, wherein the fiber is loose within the tube, that is, the fiber can be pulled out of a reasonable length of tube, e.g., three feet (hereinafter referred to as a "loose tube" construction).

The design of protective coverings and, in particular, loose tube coverings has proved to be a difficult problem since the coverings must satisfy a variety of stringent and, in many cases, conflicting requirements.

Thus, the coverings need to be strong enough to protect the fiber from substantial tensile (longitudinal) loads, and yet flexible enough to bend without kinking since kinking results in high bend losses. Moreover, in many cases, the coverings must be tough enough to withstand prolonged exposure to harsh environmental conditions, again without losing their flexibility. The coverings also must be easily strippable from the fiber both in a manufacturing setting and in the field.

In addition to these requirements, the protective covering should also be as small as possible, i.e., the finished covering/fiber structure should have a small an outside diameter (OD) as possible so as to minimize space consumption in plenums, junction boxes, and the like. Commercially available, high strength protective coverings which have included reinforcing strength members, e.g., aramid fibers, have had OD's greater than about 2,000 microns, with 2,900 microns being a typical dimension. Non-reinforced protective tubes having OD's on the order of 1,000 microns have been prepared (see discussion of the SILEC protective tubes below). However, prior to the present invention, the 1,000 micron level has not been achieved in a reinforced, loose tube construction.

For some applications, the requirements for the coverings are even more stringent. In particular, optical waveguide couplers, i.e., devices in which at least a portion of the light propagating in one fiber is coupled to one or more other fibers, add the further requirement that the protective covering must have a high thermal stability. This requirement is particularly acute in the case of achromatic couplers which operate at more than one frequency, e.g., 1300 and 1550 nanometers, since longer wavelength signals tend to be more sensitive to bend losses.

The origin of the thermal matching requirement can be seen in FIG. 1 which illustrates a typical coupler construction. A general discussions of couplers can be found in the following U.S. patents, the relevant portions of which are incorporated herein by reference: Keck, U.S. Pat. No. 4,704,151; Dohan et al., U.S. Pat. No. 4,765,702; Miller et al., U.S. Pat. No. 4,902,324; Beguin, U.S. Pat. No. 4,933,262; and Dannoux et al., U.S. Pat. No. 4,943,130.

As shown in FIG. 1, coupler 11 includes coupler body 15 and a plurality of "pigtails" 19 which extend from the coupler body. Each pigtail includes a connector 17, an optical waveguide fiber 35 (FIG. 2) which connects the body to the connector, and a protective tube 13 which loosely surrounds the optical waveguide fiber and is connected to the body and the connector. The ends of both the optical waveguide fiber and the protective tube 13 are fixed at both the coupler body and the connector. Accordingly, differences in the thermal expansion coefficients of the fiber and the tube over the operating range of the coupler, e.g., from −40° C. to +85° C., will manifest themselves as relative changes in the lengths of the fiber and the tube.

In particular, when the tube becomes shorter than the fiber, the fiber will bend resulting in bending losses which can be as large as 10–20 dB depending upon the magnitudes of the temperature change and the expansion coefficient mismatch. On the other hand, when the tube becomes longer than the fiber, actual fractures of the fiber have been observed in extreme cases. Since optical waveguide fibers are primarily composed of silica and since silica has a low thermal expansion coefficient, i.e., on the order of $10^{-7}$ cm/cm/° C., the thermal matching requirement basically means that the protective tube must have limited expansion and contraction over the operating range of the coupler, a difficult requirement to meet since plastic materials typically have relatively high expansion coefficients.

Because of the difficulty in satisfying all of the foregoing requirements simultaneously, a variety of protective tube and cable constructions have been proposed in the art. Examples of such constructions are as follows.

Protective tubes for use in couplers have been sold by the Societe Industrielle de Liaisons Electriques, Paris, France, under the trademark SILEC and the product designation CDR 2. See SILEC's product catalog entitled "Flexible Protective Tubes for Optical Fibers," Notice No. SCFO-06, 1987. These tubes are composed of a polypropylene inner layer surrounded by a polyethylene outer layer and are said to have a reduced expansion coefficient. The tubes have an outside diameter of 1,100 microns. In practice, the SILEC tubes have been found to be relatively stiff and to contract upon heating. Comparative data for the SILEC tubes and the tubes of the present invention is presented below.

Tubes and cables having various constructions have been sold by Siecor Corporation, Hickory, N.C. See The Fiber Optic Catalog—1988-1989, pages 1.2, 1.3, and 1.20, 1988. In particular, Siecor has sold "Fan-Out Tubing" which has an OD of 2,900 microns and is composed of a PVC outer jacket, a layer of aramid fiber, and a fluoropolymer inner tube. The inner tube surrounds an optical fiber in a loose tube construction. Siecor has also sold "Interconnection Cables" comprising a PVC outer jacket and a thermoplastic layer in direct contact with the optical fiber, i.e., a tight buffered construction. The cable has an outside diameter of 2,900 microns. The thermoplastic layer can be a polyester elastomer such as DuPont's HYTREL brand elastomer. The PVC jacket and the thermoplastic layer are not in contact but are separated by a layer of stranded aramid fiber. This layer, plus the tight-buffered construction, makes the Interconnection Cable more difficult to strip than the protective tube of the present invention.

Fuse et al., U.S. Pat. No. 4,629,286, discloses a tight buffered construction in which buffer layer 3 is in contact with resin layer 4 which, in turn, is in contact with reinforced layer 5. An ultrafine gap can be left between the buffer layer and the resin layer. Reinforced layer 5 comprises a resin matrix in which are embedded strength members such as glass fiber, carbon fiber, or aramid fiber. The resin matrix can be composed of a heat-curable, unsaturated polyester, an epoxy, a silicone or vinyl ester, or a heat-curable polyamide. The resin layer 4 can be composed of the same material as the resin matrix of layer 5 or, preferably, is composed of a thermosetting resin such as a polyester resin or a polyamide resin, or a urethane or epoxy acrylic compound. The completed fiber/tube combination has an outside diameter of between 950 and 1,000 microns.

Johnson et al., U.S. Pat. No. 4,723,831, discloses an optical fiber cable which includes core wrap 12, which is composed of woven fiber glass which has been impregnated with polytetrafluoroethylene, and jacket 15, which is composed of polyvinyl chloride (PVC). Embedded in the PVC jacket are three equally-spaced strength members 16 which are preferably composed of glass fibers. Alternatively, the strength members can be composed of KEVLAR brand aramid fiber. The strength members are impregnated with a material such as a urethane, an acrylic acid or acrylate-based material, an epoxy, a polyester, or a polyvinyl chloride or other vinyl-based material so as to produce a strong coupling between the strength members and jacket 15.

Arroyo, U.S. Pat. No. 4,730,894, discloses an optical fiber cable which includes strength members 86 which are adhesively bonded to a carrier tape 82 made of MYLAR brand polyester film. The preferred strength members are glass rods having a diameter of 0.035 inches (890 microns) held together in a polyurethane matrix. KEVLAR brand aramid yarn is also mentioned as a possible strength member. All but a small portion of the circumference of each strength member is embedded in outer jacket 54 which is preferably composed of high density polyethylene and has a wall thickness of 0.050 inches (1270 microns). The cable includes an inner tube 28 also of high density polyethylene which has a wall thickness of 0.030 inches (760 microns). The overall outside diameter of the cable is thus at least 2,000 microns.

Ramsay et al., U.S. Pat. No. 4,756,600, discloses an optical fiber cable of the tight buffered type having coating layer 4 which can comprise a HYTREL brand polyester elastomer, strength layer 32 composed of two layers of KEVLAR brand aramid fiber held in place by polyester wrap 33, and outer layer 31 also composed of HYTREL. The overall cable has an outside diameter of 3,000 microns.

Taylor et al., U.S. Pat. No. 4,776,910, discloses an optical fiber cable which employs aromatic polyamide strength members both in its outer sheath 8 and along the center of the bore of internal sheath 5. Sheaths 8 and 5 are both composed of polyethylene.

Calzolari et al., U.S. Pat. No. 4,932,746, discloses an optical fiber cable having: (a) a central strength member 1, which can be made of an aromatic polyamide, (b) a plurality of small tubes 3 each of which carries an optical fiber, and (c) a core 2 in which the small tubes are embedded. The patent states that the small tubes and the core should be made of materials which do not bond or link even at their softening temperature. Among the materials which can be used to make the core/tube are polyamides, polybutene terephthalate, low density polyethylene, polypropylene, and polyurethanes. See also Calzolari et al., U.S. Pat. No. 4,902,096.

U.K. Patent application No. 2,185,828 discloses an optical fiber cable which includes a reinforcing layer 25 which comprises KEVLAR brand fibers embedded in a plastic material which can be a thermoplastic material, such as polypropylene or nylon, or a thermosetting material, such as, a polyester or epoxy resin or a polyurethane. Surrounding the reinforcing layer is a protective sheath 27 composed of polyethylene.

SUMMARY OF THE INVENTION

In view of the foregoing state of the art, it is an object of the present invention to provide an improved protective tube for optical waveguide fibers. More particularly, it is an object of the invention to provide a protective tube which is strong, flexible, able to withstand harsh environmental conditions, easily strippable, and which has a high thermal stability. In addition, it is a object of the invention to provide a protective tube which has these characteristics and yet has an outs de diameter which does not exceed about 1,000 microns.

It is a further, specific object of the invention to provide a protective covering of the loose tube type which (a) is reinforced, and (b) has an outside diameter of less than about 1,000 microns.

It is also an object of the invention to provide improved optical waveguide couplers which include protective tubes having the foregoing characteristics.

It is an additional object of the invention to provide methods for manufacturing protective tubes of the foregoing type.

To achieve these and other objects, the invention in accordance with certain of its aspects provides a protective tube for an optical waveguide fiber which includes an inner plastic layer (first tubular member) and an outer plastic layer (second tubular member) which are in contact over a substantial portion of their mating surfaces, and one or more flexible strength members (reinforcing members) which lie between and are in contact with both the inner and outer layers but are not substantially embedded in either of those layers, i.e., the strength members can be readily pulled away from both layers as, for example, during stripping. The protective tube is preferably used to surround a single optical fiber in a loose tube construction.

The inner layer is preferably more flexible than the outer layer, and the outer layer is preferably stronger and tougher than the inner layer. In this way, the combination of the strength members and the outer layer provide the protective tube with the majority of its strength and toughness, while the combination of the inner layer, the flexibility of the strength members, the fact that the strength members are not embedded in either the inner or the outer layer, and the tube's overall small diameter provide the tube with the majority of its flexibility.

Preferred materials for the inner and outer layers which exhibit the foregoing strength, toughness, and flexibility properties comprise a polyester elastomer for the inner layer and a semi-rigid polyvinyl chloride for the outer layer. Other materials which can be used include nylon, polyurethanes, and thermoplastic elastomers for the inner layer, and polyesters, nylon, and polyurethanes for the outer layer.

In addition to providing flexibility to the protective tube, the fact that the strength members are not embedded in either the inner or the outer layer also provides for easy strippability. The high area of contact between the inner and outer layers is also an important factor in easy strippability. Specifically, using a conventional stripping tool, the inner and outer layers can be readily removed, as a unit, from the fiber and the strength members. Completion of the stripping process then simply involves cutting away the exposed portions of the strength members.

The tube's thermal stability is primarily provided by the strength members. Accordingly, when thermal stability is required, as in the case of couplers, the material used for these members should have a relatively low thermal expansion coefficient. In particular, the strength members should have a coefficient of thermal expansion whose magnitude is less than about $10^{-5}$ cm/cm/° C.

A preferred material for the strength members comprises yarns of KEVLAR brand aramid fibers sold by DuPont. Compared to most organic-based materials, these fibers have a relatively low coefficient of thermal expansion, e.g., on the order of $-2 \times 10^{-6}$ cm/cm/° C. Moreover, the expansion coefficient for KEVLAR fibers is negative rather than positive, i.e., as the temperature increases, the fibers contract rather than expand. Accordingly, since the plastic materials used for the inner and outer layers generally have positive expansion coefficients, there are competing expansion/contraction forces within the protective tube as temperature changes. These competing forces, in combination with KEVLAR's low coefficient of thermal expansion, tend to minimize the overall change in the tube's length.

In addition to its thermal properties, KEVLAR is a preferred material for the strength members because of its high load bearing ability in combination with the fact that it does not undergo local kinking when bent.

Other materials which can be used for the strength members include glass, steel, and nylon. These materials, however, do not have a negative coefficient of thermal expansion and thus do not produce the competing expansion/contraction forces which are generated when KEVLAR fibers are used.

In addition to the inner and outer layers, the protective tube can also include a coating on its inner surface of a low coefficient of friction material, e.g., a coating of TEFLON brand tetrafluoroethylene (TFE). Such a coating facilitates the insertion of optical waveguide fibers into the protective tubes.

The protective tube preferably has an outside diameter (OD) of approximately 900 microns and an inside diameter of approximately 500 microns. The resulting 200 micron wall thickness is roughly equally divided between the inner and outer layers. The strength members preferably have a thickness of about 50 microns. In some cases, the inner and/or the outer surfaces of the protective tube may contain a slight bulge at the locations of the strength members. In practice, such bulges have not been found to interfere in any way with the performance of the protective tube.

In accordance with other aspects of the invention, the protective tube is prepared by the steps of:

(a) providing a core member whose outer surface has a low coefficient of friction;

(b) applying a first layer of plastic material to the core member, i.e., applying the inner layer of the protective tube to the core member;

(c) applying strength members and a second layer of plastic material onto the first layer of plastic material, i.e., applying the strength members and the outer layer of the protective tube onto the inner layer of the protective tube; and (d) removing the core member to produce the protective tube.

Suitable core members include glass fibers and metal wires having an outside diameter corresponding to the desired inside diameter of the protective tube, e.g., a fiber or wire having an outside diameter of approximately 500 microns. The coefficient of friction of the outer surface of the core member must be low enough to allow the core member to be pulled away from the first layer in step (d). Preferably, a coating is used to lower the coefficient of friction of the outer surface of the core member. In particular, a coating of tetrafluoroethylene (TFE) is preferred since upon removal of the core member a thin layer of TFE can remain along the inside surface of the protective tube. As discussed above, such a layer of TFE can aid in the insertion of an optical fiber into the protective tube. Alternatively, the TFE coating can be removed with the core member.

Steps (b) and (c) of the above process can be performed using various coating techniques known in the art. For example, a wire line extrusion process can be used in step (b) and a coating die and pressure coating process can be used in step (c). Step (d) can be performed by exposing the core at one end of tube/core combination, placing the exposed core in a vise or the like, and then pulling the protective tube off of the core from the opposite end of the tube/core combination.

The accompanying drawings, which are incorporated in and constitute part of the specification, illustrate the preferred embodiments of the invention, and together with the description, serve to explain the principles of the invention. It is to be understood, of course, that both the drawings and the description are explanatory only are are not restrictive of the invention.

DESCRIPTION OF THE PREFERRED EMBODIMENTS

As discussed above, the present invention relates t protective tubes for optical waveguide fibers. The invention can be used with a variety of optical waveguide fibers now known or subsequently developed, including, without limitation, single mode and multimode fibers, silica-based and nonsilica-based fibers, and plastic fibers.

Figure 1:
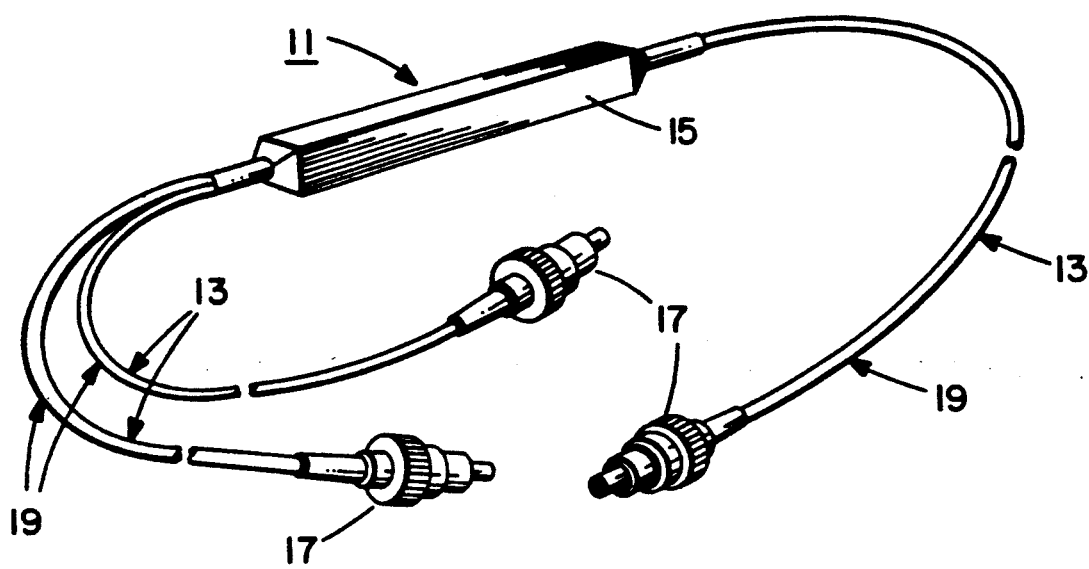
FIG. 1 is a perspective view of an optical waveguide coupler.
Figure 2:
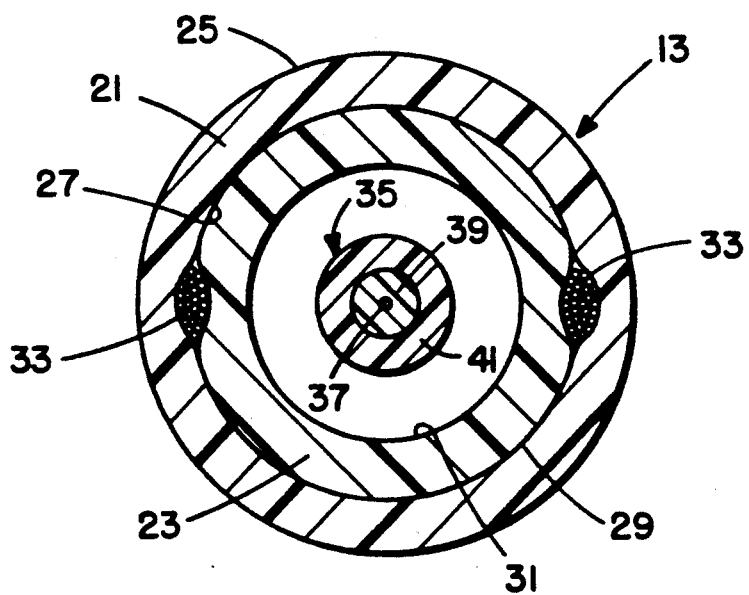
FIG. 2 is a cross-sectional view of a protective tube constructed in accordance with the invention.

A cross-section of a protective tube 13 prepared in accordance with the invention is shown in FIG. 2. The tube includes: (a) outer tubular member 21, having outer surface 25 and inner surface 27; (b) inner tubular member 23, having outer surface 29 and inner surface 31; and (c) flexible strength (reinforcing) members 33.

Outer surface 25 defines the outside diameter (OD) of the protective tube, and inner surface 31 defines its inside diameter (ID). Located within the bore of tube 13 is optical fiber 35, which, as shown, includes core 37, cladding 39, and plastic coating 41. Core 37 typically comprises doped silica, cladding 39 typically comprises silica, and coating 41 typically comprises a UV curable acrylate polymer. In general terms, core 37 typically has an OD of approximately 10 microns, cladding 39 has an OD of approximately 125 microns, and coating 41 has an OD of approximately 250 microns.

As can be seen in FIG. 2, essentially the entire outer surface 29 of inner tubular member 23 is in contact with essentially the entire inner surface 27 of outer tubular member 21. The only portions which are not in contact are those in the region of the flexible strength members 33. As discussed above, this contact leads to easy strippability since a conventional stripping tool will remove the inner and outer tubular members as a unit. Also, the contact causes the entire protective tube, i.e., the inner and outer tubular members and the strength members, to expand and contract as a unit. In this way, the low coefficient of expansion of the strength members controls the overall expansion and contraction of the tube.

As shown in FIG. 2, protective tube 13 includes two strength members 33. More or less strength members can be used, if desired. Due to the small size of the protective tube, it has been found in practice that additional strength members beyond two tend to coalesce during the coating process into two diametrically-opposed groups. Accordingly, for small tube applications, protective tube 13 will normally include two strength members. Strength members 33 are preferably oriented along the longitudinal axis of tube 13 in a non-stranded configuration, although other patterns known in the art, such as a helical pattern, can be used if desired.

As discussed above, the preferred materials for the components of protective tube 13 are a polyester elastomer for inner tubular member 23, a semi-rigid polyvinyl chloride polymer for outer tubular member 21, and aramid fibers for strength members 33. As also mentioned above, inner surface 31 of inner tubular member 23 can include a coating (not shown) of a low friction material, in particular, a coating of tetrafluoroethylene.

Specific commercially available products which have been found to work successfully in the practice of the invention are as follows: HYTREL brand polyester elastomer sold by E. I. DuPont DeNemours and Company, Wilmington, Del., under product number G6356; semi-rigid polyvinyl chloride (PVC) sold by Gary Chemical, Leominster, Mass., under the product designation PVC GW 2052 Special; KEVLAR brand aramid yarn sold by DuPont under the product number 49 and having a denier of 195; and TEFLON brand tetrafluoroethylene sold by DuPont as a water-based dispersion under the product designation PTFE fluorocarbon dispersion 30b.

Using these materials, protective tubes 13 have been prepared in accordance with the following procedures. First, a core member was prepared by applying a 5-10 micron TEFLON coating to a substrate comprising a length of optical fiber having a nominal outside diameter of 500 microns. The TEFLON was applied using a conventional die extrusion process.

Specifically, the water-based TEFLON dispersion described above was mixed with a RHOPLEX binder (Rohm and Hass, Philadelphia, Pa., product number AC-33) at a concentration of one percent, and supplied to the coating block of a conventional extrusion coater. The coating block had an incoming (guiding) orifice of 0.021 inches and an outgoing (coating) orifice of 0.022 inches. The coating was performed at room temperature, and fiber was pulled through the coating block at a rate of approximately 0.9 meters/second. After leaving the coating block, the fiber was passed through a series of 500° C. ovens to dry the TEFLON onto the fiber. The completed core member with its TEFLON coating wa then collected on a reel for subsequent use.

Using a wire line extrusion process, the HYTREL polyester elastomer was coated onto the TEFLON-coated core member. Specifically, pellets of the HYTREL material were melted by the extruder and applied to the core member at a line speed of approximately 1.0 meter/second. The resulting product was cooled by means of a water bath and then collected on a take-up reel. The OD of the product at this point was in the 600-700 micron range, with a nominal value of 650 microns. The HYTREL layer thus had a nominal thickness on the order of 75-100 microns.

KEVLAR yarn, which comprised continuous strands of KEVLAR fibrils, was combined with the HYTREL-coated core member and that combination was coated with PVC using an extrusion process similar to that used for the TEFLON coating. In this case, the coating block had an incoming (guiding) orifice of 0.034 inches and an outgoing (coating) orifice of 0.039 inches, and the block was equipped with heating means to keep the PVC in a molten state, e.g., at a temperature of approximately 160° C. In initial experiments, three strands of KEVLAR yarn were supplied to the coater. As discussed above, in practice it was found that two of the strands coalesced so that the final product had only two strength members. Accordingly, only two strands of KEVLAR yarn need be supplied to the coater. The protective tubes used in the comparative experiments described below were prepared using the three strand approach.

The PVC/KEVLAR coater was operated at a line speed of approximately 0.75 meters/second. The coated product was cooled by means of an air gap followed by a room temperature water bath, and was then collected on a take-up reel. The OD of the product at this point was in the 900-1,000 micron range, with a nominal value of 950 microns. The PVC layer thus had a nominal thickness on the order of 100-150 microns.

Finished protective tubing was prepared by cutting off lengths of the composite and removing the core member. Specifically, the HYTREL and PVC layers and the KEVLAR strength members were removed from one end of the composite so as to expose the core, the exposed core was placed in a vise, and the protective tube was pulled off of the core member from the opposite end of the composite. In this process, it has been found advantageous not to apply pressure to the composite at any point other than the end at which the pulling is performed.

Protective tubes prepared in accordance with the above procedures were subjected to a variety of performance tests and were found to operate successfully in all respects. In particular, the thermal expansion behavior of the tubes was tested and compared with the thermal expansion behavior of the prior art SILEC protective tubes.

Figure 3:
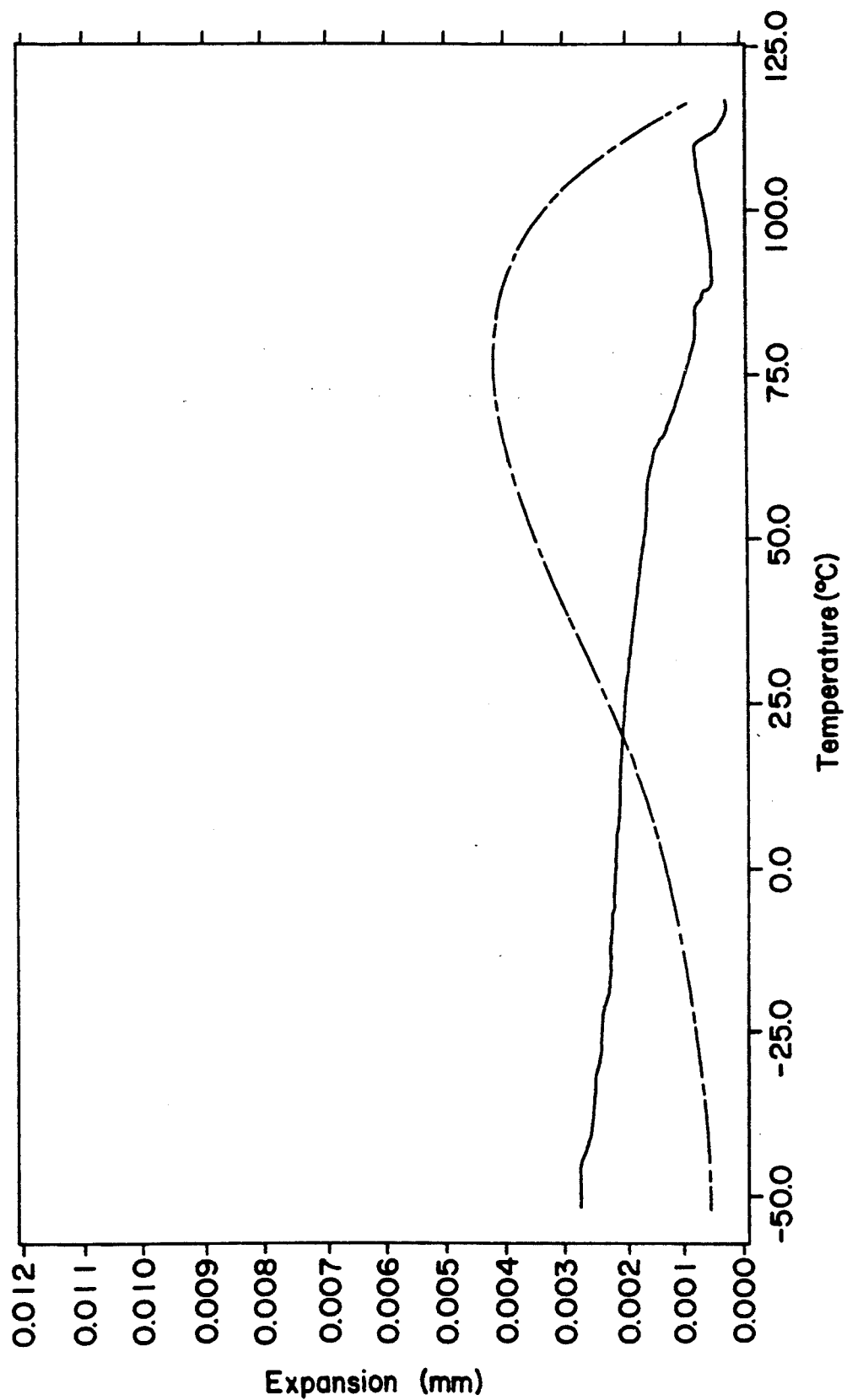
FIG. 3 is a comparative plot of the thermal behavior of the protective tube of the present invention (solid line) versus the thermal behavior of the prior art SILEC protective tube (broken line).

The tests were performed using a PERKIN-ELMER 7 Series Thermal Analysis System. A temperature range of from −60° C. to +125° C. was used with the temperature being changed at a rate of 10° C./minute. The results are shown in FIG. 3, where the solid line represents the response of the protective tubes of the present invention and the broken line represents the response of the SILEC tube. As shown in this figure, the tubes of the present invention had significantly smaller changes in length with changes in temperature than the SILEC tubes. As also illustrated in this figure, the inventive tubes had an overall negative coefficient of thermal expansion, i.e., the length of the tubes decreased as the temperature increased.

Thermal cycling experiments were also performed on the tubes of the invention wherein a section of tube was placed at the middle of a longer section of fiber and the ends of the tube were fixed to the fiber using an epoxy cement (LOCTITE 489 air cure epoxy). The power thru-put of the fiber at 1310 nm and 1550 nm was then tested as the temperature of the 85° C. Test results showed no greater than a 0.02 dB excursion in power thru-put over the entire 125 degree temperature range.

Figure 4:
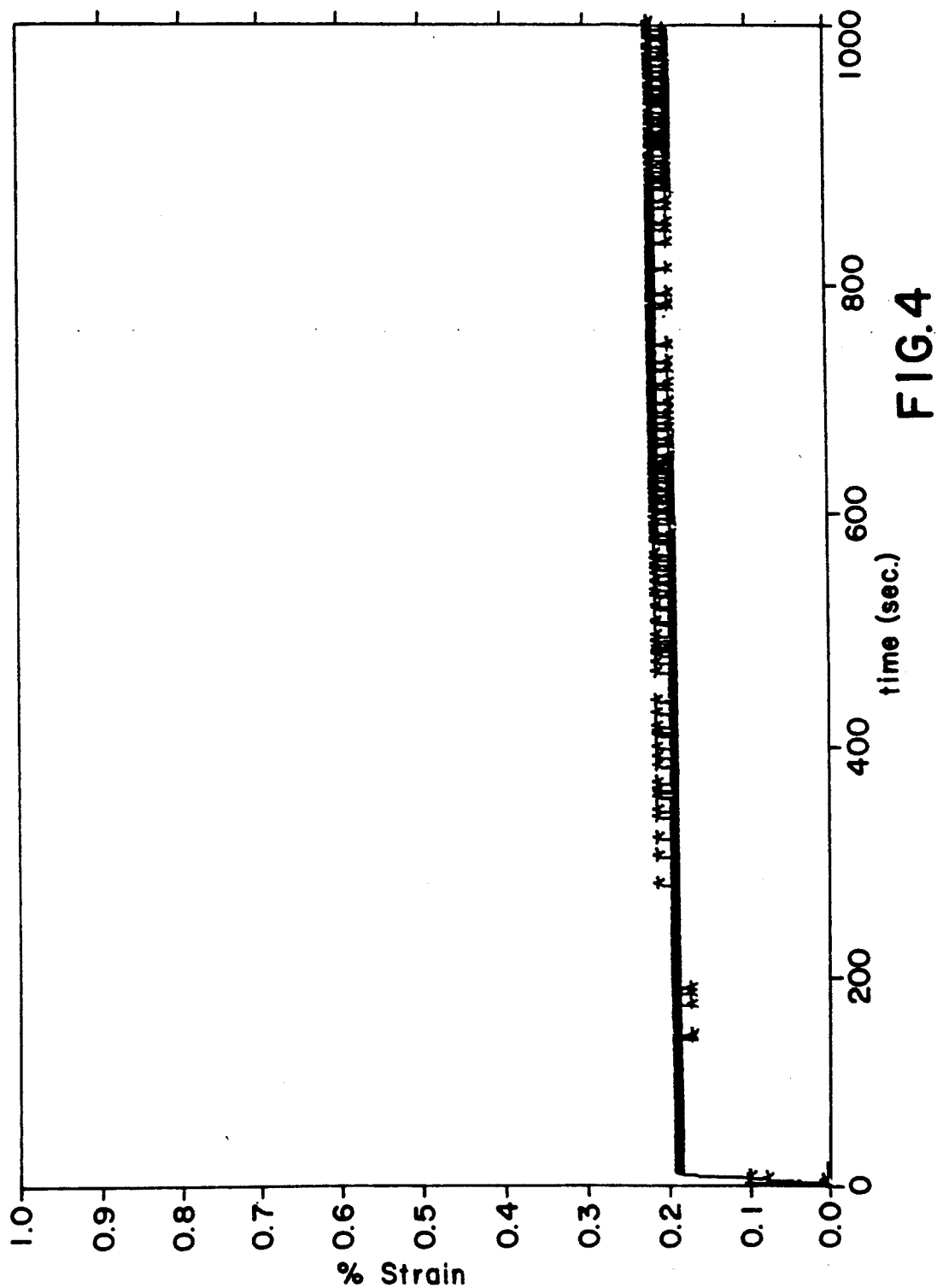
FIG. 4 is a plot of the load (creep) response of the protective tube of the present invention.
Figure 5:
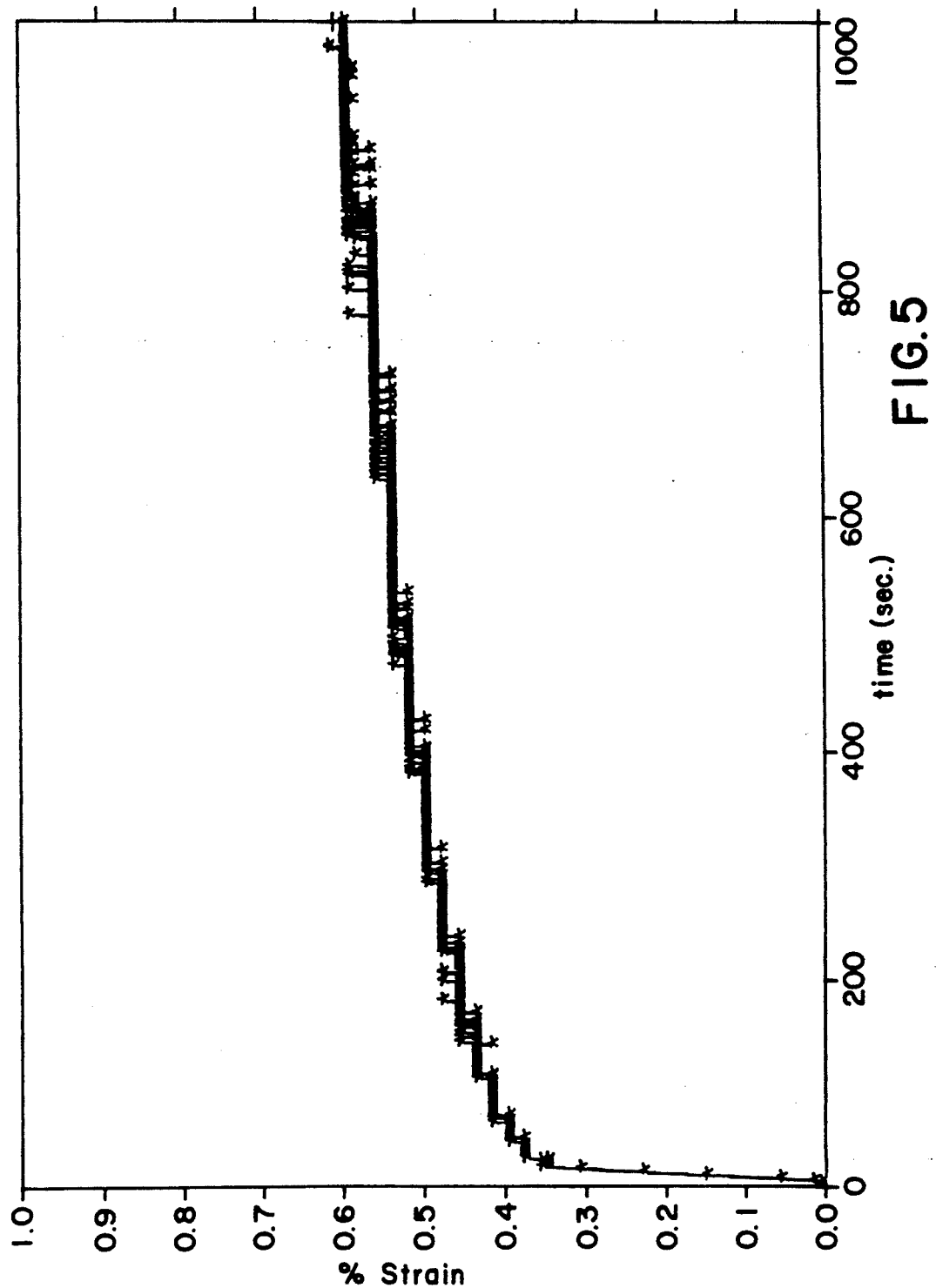
FIG. 5 is a plot of the load (creep) response of the prior art SILEC protective tube.

Load (creep) tests were performed on the inventive tubes and the SILEC tubes. In this test, a 2 pound weight was hung from a section of tube and the elongation as a function of time was measured. The experiments were performed at room temperature. The results for a tube prepared in accordance with the present invention are shown in FIG. 4, while those for the SILEC tube are shown in FIG. 5. As can be seen from these figures, the inventive tube had an elongation of less than 0.2 percent which did not increase with time. The SILEC tube, on the other hand, had a base elongation which was twice as large (0.4 percent) and that elongation increased the longer the load was applied.

It is significant to note that the tubes of the present invention are not only stronger than the SILEC tubes but also are significantly more flexible. In particular, for the same level of bend losses, the inventive tubes can be bent through a smaller radius than the SILEC tubes.

Additional tensile loading tests were performed on the inventive tubes both at room temperature and at an elevated temperature of 85° C. In these tests, an end piece of the type used commercially to attach protective tubes to coupler bodies was epoxied to a 0.5 meter length of the inventive tube. A 5 pound load was suspended from the end piece for a period of 20 hours at room temperature. Less than one percent elongation was observed. The experiment was repeated for a period of 2 hours at 85° C. using a 2 pound weight. Again, the elongation was less than one percent. A further experiment was performed at 85° C. using a 5 pound weight. In this experiment, the epoxy appeared to yield resulting in an elongation of more than one percent after a period of 1 hour.

Shrinkage tests were also performed on the inventive tubes. In these experiments, two test samples were cut to 0.5 meter lengths and inserted into individual 2 millimeter diameter silica tubes. The test sample was epoxied to one end of the silica tube and trimmed at the opposite end such that the length of the sample and the silica tube were equal. Both samples were then inserted into a thermal chamber at 100° C. for 1,000 hours. No measurable change in sample length was detected at test termination.

Although specific embodiments of the invention have been described and illustrated, it is to be understood that modifications can be made without departing from the invention's spirit and scope. For example, depending upon the application, the tubes can include other protective layers known in art, such as, polymer or metal jackets for rodent and/or lightening protection. Similarly, the tubes can be used as components of larger cables designed to protect a multitude of optical waveguide fibers.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. A protective loose tube for a single optical waveguide fiber comprising:
   (a) a first plastic tubular member having an inner surface and an outer surface;
   (b) a second plastic tubular member having an inner surface and an outer surface; and
   (c) at least one flexible strength member;
   wherein:
      (i) substantial portions of the outer surface of the first tubular member and the inner surface of the second tubular member are in contact,
      (ii) the at least one flexible strength member lies between and is in contact with both the outer surface of the first tubular member and the inner surface of the second tubular member but is not substantially embedded in either of those tubular members, and
      (iii) said protective loose tube has an outside diameter of less than or equal to about 1,000 microns.

2. The protective tube of claim 1 wherein essentially the entire outer surface of the first tubular member is in contact with essentially the entire inner surface of the second tubular member except for the portions of those surfaces which are in the region of the at least one flexible strength member.

3. The protective tube of claim 1 wherein the first tubular member is more flexible than the second tubular member.

4. The protective tube of claim 1 wherein the at least one flexible strength member is composed of aramid fibers.

5. The protective tube of claim 1 wherein the inner surface of the first tubular member defines the inside diameter of the protective tube and the outer surface of the second tubular member defines the outside diameter of the protective tube, said inside diameter being approximately 500 microns and said outside diameter being approximately 900 microns.

6. A protective tube for an optical waveguide fiber comprising:
   (a) a first plastic tubular member having an inner surface and an outer surface;
   (b) a second plastic tubular member having an inner surface and an outer surface; and
   (c) at least one flexible strength member;
   wherein:
      (i) substantial portions of the outer surface of the first tubular member and the inner surface of the second tubular member are in contact, (ii) the at least one flexible strength member lies between and is in contact with both the outer surface of the first tubular member and the inner surface of the second tubular member but is not substantially embedded in either of those tubular members, and (iii) the tensile strength of the second tubular member is greater than the tensile strength of the first tubular member.

7. A protective tube for an optical waveguide fiber comprising:

(a) a first plastic tubular member having an inner surface and an outer surface;

(b) a second plastic tubular member having an inner surface and an outer surface; and (c) at least one flexible strength member; wherein:

(i) substantial portions of the outer surface of the first tubular member and the inner surface of the second tubular member are in contact, (ii) the at least one flexible strength member lies between and is in contact with both the outer surface of the first tubular member and the inner surface of the second tubular member but is not substantially embedded in either of those tubular members, and (iii) the first tubular member is composed of a polyester elastomer and the second tubular member is composed of a polyvinyl chloride polymer.

8. The protective tube of claim 1 wherein the first tubular member is composed of a polyester elastomer, the second tubular member is composed of a polyvinyl chloride polymer, and the at least one flexible strength member is composed of aramid fibers.

9. A protective tube for a single optical waveguide fiber comprising:

(a) a first plastic tubular member having an inner surface and an outer surface;

(b) a second plastic tubular member having an inner surface and an outer surface; and (c) at least one flexible strength member; wherein:

(i) substantial portions of the outer surface of the first tubular member and the inner surface of the second tubular member are in contact, (ii) the at least one flexible strength member lies between and is in contact with both the outer surface of the first tubular member and the inner surface of the second tubular member but is not substantially embedded in either of those tubular members, (iii) the at least one flexible strength member has a coefficient of thermal expansion whose magnitude is less than about $10^{-5}$ cm/cm/°C., and (iv) said protective tube has an outside diameter of less than or equal to about 1,000 microns.

10. A protective tube for an optical waveguide fiber comprising:

(a) a first plastic tubular member having an inner surface and an outer surface;

(b) a second plastic tubular member having an inner surface and an outer surface; and (c) at least one flexible strength member; wherein:

(i) substantial portions of the outer surface of the first tubular member and the inner surface of the second tubular member are in contact, (ii) the at least one flexible strength member lies between and is in contact with both the outer surface of the first tubular member and the inner surface of the second tubular member but is not substantially embedded in either of those tubular members, and (iii) the at least one flexible strength member has a negative coefficient of thermal expansion and the first and second tubular members each have a positive coefficient of thermal expansion, and (iv) said protective tube has an outside diameter of less than or equal to about 1,000 microns.

11. A protective tube for an optical waveguide fiber comprising:

(a) a first plastic tubular member having an inner surface and an outer surface;

(b) a second plastic tubular member having an inner surface and an outer surface; and (c) at least one flexible strength member; wherein:

(i) substantial portions of the outer surface of the first tubular member and the inner surface of the second tubular member are in contact, (ii) the at least one flexible strength member lies between and is in contact with both the outer surface of the first tubular member and the inner surface of the second tubular member but is not substantially embedded in either of those tubular members, and (iii) at least a portion of the inner surface of the first tubular member is coated with tetrafluoroethylene.

12. A loose tube optical waveguide fiber assembly comprising:

(a) an optical waveguide fiber; and (b) a reinforced protective tube loosely surrounding said fiber, said tube comprising an inner layer composed of a polyester elastomer, an outer layer composed of a polyvinyl chloride polymer, and reinforcing means, located between the inner and outer layers, comprising aramid fibers.

13. The loose tube optical waveguide fiber assembly of claim 12 wherein said reinforced protective tube has an outside diameter of less than about 1,000 microns.

14. An optical waveguide coupler comprising a body and a plurality of pigtails extending from the body, each pigtail comprising a connector, a single optical waveguide fiber which connects the body to the connector, and a protective loose tube which loosely surrounds the optical waveguide fiber and is connected to the body and the connector, said protective loose tube comprising:

(a) a first plastic tubular member having an inner surface and an outer surface;

(b) a second plastic tubular member having an inner surface and an outer surface; and (c) at least one flexible strength member; wherein:

(i) substantial portions of the outer surface of the first tubular member and the inner surface of the second tubular member are in contact, (ii) the at least one flexible strength member lies between and is in contact with both the outer surface of the first tubular member and the inner surface of the second tubular member but is not substantially embedded in either of those tubular members, and (iii) said protective loose tube has an outside diameter of less than or equal to about 1,000 microns.

15. The coupler of claim 14 wherein the at least one flexible strength member has a coefficient of thermal expansion whose magnitude is less than about $10^{-5}$ cm/cm/° C.

16. The coupler of claim 14 wherein the inner surface of the first tubular member defines the inside diameter of the protective tube and the outer surface of the second tubular member defines the outside diameter of the protective tube, said inside diameter being approximately 500 microns and said outside diameter being approximately 900 microns.

17. The coupler of claim 14 wherein the first tubular member is composed of a polyester elastomer, the second tubular member is composed of a polyvinyl chloride polymer, and the at least one flexible strength member is composed of aramid fibers.

18. The coupler of claim 14 wherein the coupler is an achromatic coupler.

19. An optical waveguide coupler comprising a body and a plurality of pigtails extending from the body, each pigtail comprising a connector, an optical waveguide fiber which connects the body to the connector, and a reinforced protective tube which loosely surrounds the optical waveguide fiber and is connected to the body and the connector, said protective tube comprising an inner layer composed of a polyester elastomer, an outer layer composed of a polyvinyl chloride polymer, and reinforcing means, located between the inner and outer layers, comprising aramid fibers.

20. The optical waveguide coupler of claim 19 wherein said protective tube has an outside diameter of less than about 1,000 microns.

21. A method for preparing a protective tube for an optical waveguide fiber comprising:
 (a) providing a core member whose outer surface has a low coefficient of friction;
 (b) applying a first layer of plastic material to the core member;
 (c) applying at least one strength member and a second layer of plastic material onto the first layer of plastic material; and
 (d) removing the core member to produce the protective tube.

22. The method of claim 21 wherein the core member is prepared by coating a cylindrical substrate with a material having a low coefficient of friction.

23. The method of claim 22 wherein the material is tetrafluoroethylene.

24. The method of claim 21 wherein the first layer comprises a polyester elastomer, the second layer comprises a polyvinyl chloride polymer, and the at least one strength member comprises aramid fibers.

25. The method of claim 21 wherein the core member has an inside diameter of approximately 500 microns and the protective tube has an outside diameter of less than about 1,000 microns.

* * * * *

UNITED STATES PATENT AND TRADEMARK OFFICE
CERTIFICATE OF CORRECTION

PATENT NO. : 5,201,020
DATED : April 6, 1993
INVENTOR(S) : R. Kannabiran

It is certified that error appears in the above-identified patent and that said Letters Patent is hereby corrected as shown below:

```
Col. 9, line 25 before "85°", insert -- fiber/tube
combination was cycled from -40°C to + --
```

Signed and Sealed this

Fifth Day of July, 1994

Attest:

BRUCE LEHMAN

Attesting Officer    Commissioner of Patents and Trademarks